United States Patent
Choiniere et al.

(10) Patent No.: US 11,474,365 B2
(45) Date of Patent: Oct. 18, 2022

(54) MICRO-LEVEL POLARIZATION SCANNING AND MULTISPECTRAL SCANNING WITHIN AN OPTICAL OBJECTIVE

(71) Applicant: BAE SYSTEMS Information and Electronic Systems Integration Inc., Nashua, NH (US)

(72) Inventors: Michael J. Choiniere, Merrimack, NH (US); Jay W. Coffey, Chelmsford, MA (US); Jason R. Lane, Brookline, NH (US); Davis A. Lange, Sturbridge, MA (US); Jason T. Stockwell, Brookline, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 546 days.

(21) Appl. No.: 16/582,113

(22) Filed: Sep. 25, 2019

(65) Prior Publication Data
US 2021/0088799 A1    Mar. 25, 2021

(51) Int. Cl.
| | |
|---|---|
| *G01J 4/00* | (2006.01) |
| *G02B 5/30* | (2006.01) |
| *G02B 26/10* | (2006.01) |
| *G02B 27/28* | (2006.01) |
| *G02B 5/20* | (2006.01) |
| *G02B 27/64* | (2006.01) |

(52) U.S. Cl.
CPC ............ *G02B 27/28* (2013.01); *G02B 5/201* (2013.01); *G02B 5/30* (2013.01); *G02B 26/10* (2013.01); *G02B 26/101* (2013.01); *G01J 4/00* (2013.01); *G01J 2004/001* (2013.01); *G02B 5/20* (2013.01); *G02B 5/208* (2013.01); *G02B 27/286* (2013.01); *G02B 27/646* (2013.01)

(58) Field of Classification Search
CPC .... G01J 4/00–04; G01J 2004/001–008; G02B 5/30–3091; G02B 21/002–0084; G02B 26/10–129; G02B 27/28–288
See application file for complete search history.

(56) References Cited

U.S. PATENT DOCUMENTS

| | | | |
|---|---|---|---|
| 8,143,565 B2 | 3/2012 | Berkner et al. | |
| 9,664,562 B1 | 5/2017 | Goodnough et al. | |
| 9,829,384 B2 | 11/2017 | Pezzaniti et al. | |
| 2002/0064341 A1* | 5/2002 | Fauver | G02B 6/3502 |
| | | | 359/210.1 |
| 2006/0203338 A1 | 9/2006 | Pezzaniti | |
| 2012/0075513 A1* | 3/2012 | Chipman | G01J 4/04 |
| | | | 348/302 |
| 2014/0063299 A1 | 3/2014 | Fest et al. | |
| 2018/0094980 A1* | 4/2018 | Pezzaniti | G01J 3/2803 |

(Continued)

*Primary Examiner* — Ryan S Dunning
(74) *Attorney, Agent, or Firm* — KPIP Law, PLLC; Gary McFaline

(57) ABSTRACT

The system and method for imaging having filter containing polarized elements, multispectral elements or both being oscillated in circular or linear motion so each individual pixel will view a scene thru the individual filters. The motion of the filter is synchronized with a frame rate of an imager. In one example this is accomplished by micro actuators. Each pixel sampling feeds a processor detection algorithm that determines if a multispectral/polarization signature is present in the scene.

18 Claims, 5 Drawing Sheets

(56) References Cited

U.S. PATENT DOCUMENTS

| | | |
|---|---|---|
| 2018/0259617 A1 | 9/2018 | Aycock et al. |
| 2019/0049745 A1 | 2/2019 | Fest et al. |
| 2019/0056273 A1 | 2/2019 | Pezzaniti |
| 2019/0281202 A1 | 9/2019 | Chen et al. |

* cited by examiner

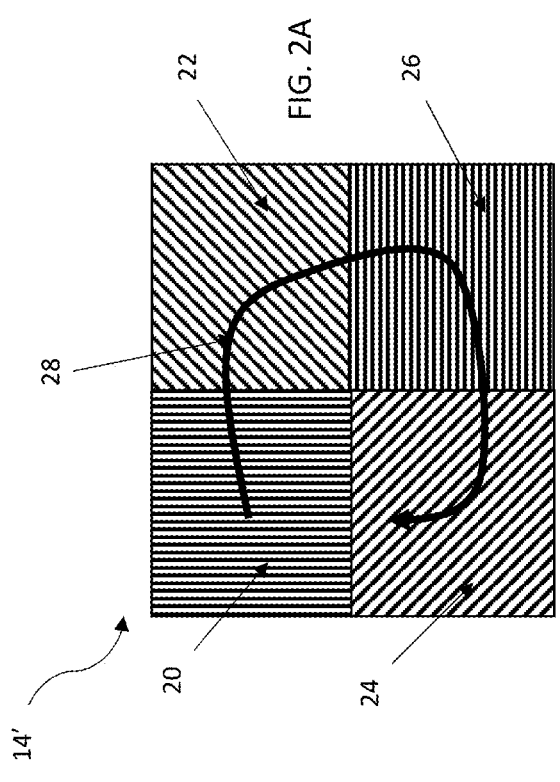
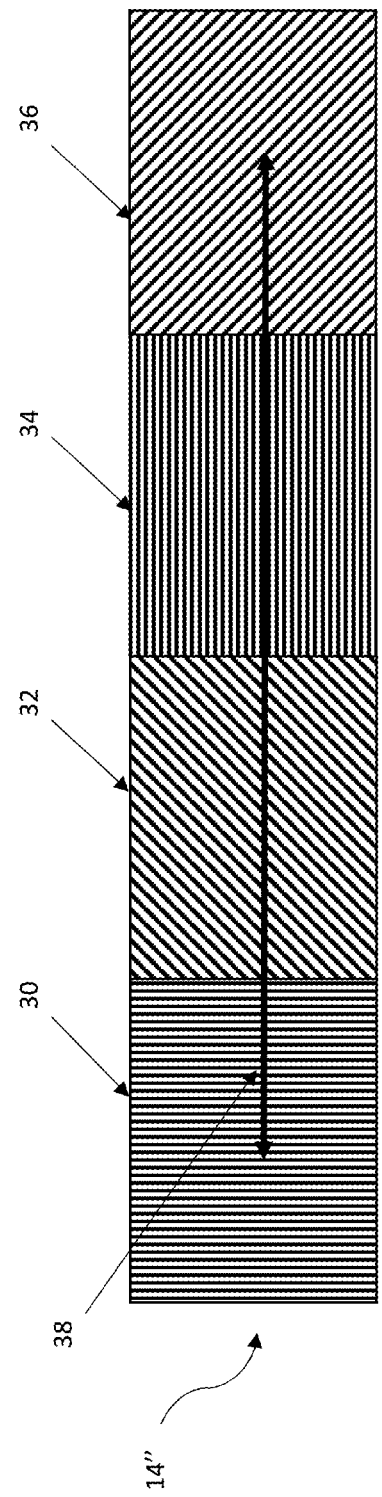

MICRO-LEVEL POLARIZATION SCANNING AND MULTISPECTRAL SCANNING WITHIN AN OPTICAL OBJECTIVE

FIELD OF THE DISCLOSURE

The present disclosure relates to target identification and classification and more particularly to the use of micro level polarization and multispectral scanning within an optical objective for target identification and classification.

BACKGROUND OF THE DISCLOSURE

Current systems using multispectral or polarization filters either image or directly apply filters to a detector (depending on the detector material). The application of the filter is typically static for optimum alignment between filter pixels and detector pixels. Some systems provide for micro adjustments for calibration in order to achieve optimum Signal-to-Noise (SNR). Some systems allow rapid insertion and removal of a filter into the objective optics for the system.

Wherefore it is an object of the present disclosure to overcome the shortcomings and drawbacks associated with the conventional target identification and classification systems.

SUMMARY OF THE DISCLOSURE

In contrast to the current systems, one embodiment of the present approach is used for staring Infrared (IR)/Electro-Optical (EO) systems where movement of the scene is not generally a requirement, particularly for applications where static imagery is collected for security or over watch positions. In the case of an Unmanned Aircraft System (UAS), or another low frequency motion system, the system of the present disclosure would be deployed in a gimbal for nearly stabilized imagery. In a high dynamic environment, a high speed gimbaled mirror may be used to remove platform motion but at an increased cost, weight, volume, and power.

One aspect of the present disclosure is a method for polarization scanning within an optical objective comprising: providing a filter assembly positioned within an objective optic of an imager, wherein the filter assembly comprises a plurality of filter sets, each filter set comprising of a number of different polarization states; providing micro-scanning actuators for moving the filter assembly within the objective optic of the imager; scanning, via filter assembly motion, radiation reflected from a scene wherein the scene is represented by a plurality of pixels on the imager; providing an image frame reference by mapping each pixel, frame by frame, to the scene; collecting contrast samples of each pixel in the scene via each filter set; correlating image frames with a processing unit and using IMU data thus providing a scene registration for each filter sample; aligning the plurality of filter samples; and nulling a vertical and a horizontal pixel motion relative to a ground in the scene in a dynamic environment.

One embodiment of the method for polarization scanning within an optical objective is wherein each filter set further comprises a number of different multispectral states. In some embodiments, the imager is a LWIR microbolometer.

Another embodiment of the method for polarization scanning within an optical objective is wherein the filter set is a 2×2 pixel filter set and the micro-scanning actuators move in a circular motion. Yet another embodiment of the method for polarization scanning within an optical objective is wherein the filter set is a 1×4 pixel filter set and the micro-scanning actuators move in a linear motion.

Certain embodiments of the method for polarization scanning within an optical objective further comprise stabilizing a ground pointing with the micro-scanners via a digital ROIC having the ability to use IMU angular rate data and shift pixel integration from a first pixel to an adjacent pixel mid integration to eliminate the need to remove vibration via post processing.

In some embodiments of the method for polarization scanning within an optical objective, a single pixel on the ground has polarization or multispectral samples from each of the filter sets that can be compared for use in target identification.

Another aspect of the present disclosure is a method for multispectral scanning within an optical objective comprising: providing a filter assembly positioned within an objective optic of an imager, wherein the filter assembly comprises a plurality of filter sets, each filter set comprising of a number of different multispectral states; providing micro-scanning actuators for moving the filter assembly within the objective optic of the imager; scanning, via filter assembly motion, radiation reflected from a scene wherein the scene is represented by a plurality of pixels on the imager; providing an image frame reference by mapping each pixel, frame by frame, to the scene; collecting contrast samples of each pixel in the scene via each filter set; correlating image frames with a processing unit and using IMU data thus providing a scene registration for each filter sample; aligning the plurality of filter samples; and nulling a vertical and a horizontal pixel motion relative to a ground in the scene in a dynamic environment.

One embodiment of the method for multispectral scanning within an optical objective is wherein each filter set further comprises a number of different polarization states. In some cases, the imager is a SWIR InGaAs array.

Another embodiment of the method for multispectral scanning within an optical objective is wherein the filter set is a 2×2 pixel filter set and the micro-scanning actuators move in a circular motion. Yet another embodiment of the method for multispectral scanning within an optical objective is wherein the filter set is a 1×4 pixel filter set and the micro-scanning actuators move in a linear motion.

Certain embodiments of the method for multispectral scanning within an optical objective further comprise stabilizing a ground pointing with the micro-scanners via a digital ROIC having the ability to use IMU angular rate data and shift pixel integration from a first pixel to an adjacent pixel mid integration to eliminate the need to remove vibration via post processing.

In some cases, a single pixel on the ground has polarization or multispectral samples from each of the filter sets that can be compared for use in target identification.

Yet another aspect of the present disclosure is a system for multispectral or polarization scanning within an optical objective comprising: an optical objective in an imager; a filter assembly positioned within the objective optic of an imager, wherein the filter assembly comprises a plurality of filter sets, each filter set comprising of a number of different polarization states; micro-scanning actuators for moving the filter assembly within the objective optic of the imager; and a processing unit configured to: correlate image frames using IMU data for providing a scene registration for each filter sample; align the plurality of filter samples; and null a vertical and a horizontal pixel motion relative to a ground in the scene in a dynamic environment.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

FIG. 2A shows one embodiment of a micro level polarization and/or multispectral scanning system with circular oscillating motion within an optical objective according to the principles of the present disclosure.

FIG. 2B shows one embodiment of a micro level polarization and/or multispectral scanning system with linear oscillating motion within an optical objective according to the principles of the present disclosure.

DETAILED DESCRIPTION OF THE DISCLOSURE

Conventional target identification systems employ fixed filters, such as polarization filters, to an imager and then scans with the imager and the optics. In contrast, micro level polarization and multispectral scanning within the optical objective as described herein, provides the means to scan a pixel sized target for polarization and/or multispectral signatures in a non push broom scanning system. One method, according to the principles of the present disclosure, reduces the scanning load and motion by >100× in both cases. In certain embodiments, this system also allows for packaging within a seeker for use with guided munitions and projectiles. As used herein, optical objective refers to the objective lens set that forms the scene image onto the focal plane array (FPA), objective is the object or the scene image.

In a direct attack scenario where a weapon is in a steep dive toward a target and at high velocity, e.g., Mach 3, the platform has little or no time to maneuver. Even performing a simple glide/push broom scanning in such a situation is taxing on the weapon's platform control system. By incorporating a micro-scan functionality into the optics, as described herein, the weapon can fly directly to the target and the information for the seeker, containing the multispectral and/or polarization information, is achievable.

Figure 1:
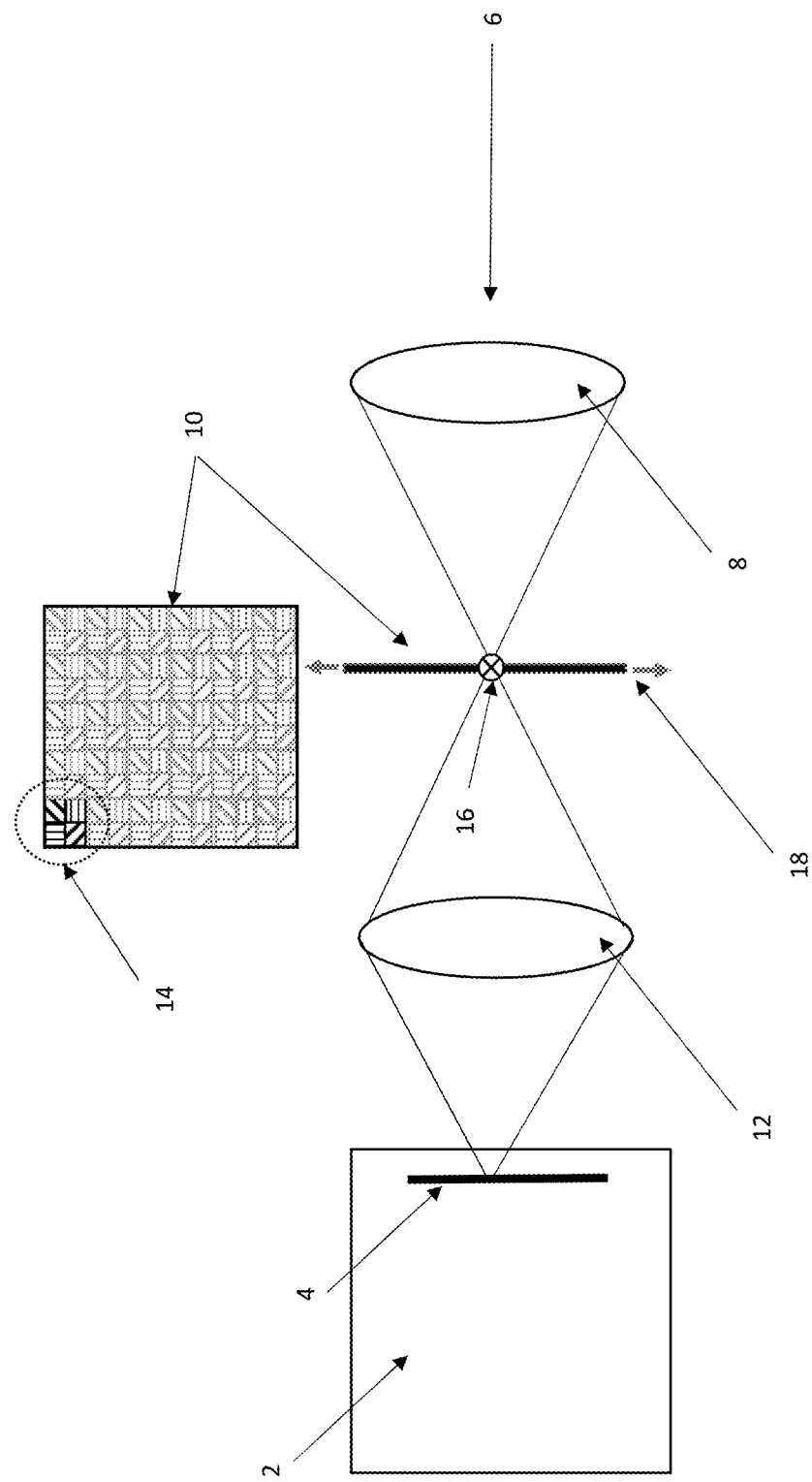
FIG. 1 is a diagrammatic view of one embodiment of a micro level polarization and/or multispectral scanning system within an optical objective according to the principles of the present disclosure.

Referring to FIG. 1, a diagrammatic view of one embodiment of a micro level polarization and/or multispectral scanning system within an optical objective according to the principles of the present disclosure is shown. More specifically, in one embodiment of the scanning system an imager 2 comprises a focal plane array (FPA) 4. An FPA is an image sensing device consisting of an array of light-sensing pixels at the focal plane of a lens 12. FPAs are used most commonly for imaging purposes, but can also be used for non-imaging purposes such as spectrometry, LIDAR, and wave-front sensing. At optical and infrared wavelengths an FPA can refer to a variety of imaging device types, but in common usage an FPA refers to two-dimensional devices that are sensitive in the infrared spectrum. Devices sensitive in other spectra are usually referred to by other terms, such as CCD (charge-coupled device) and CMOS image sensor in the visible spectrum, for example.

FPAs operate by detecting photons at particular wavelengths and then generating an electrical charge, voltage, or resistance in relation to the number of photons detected at each pixel. This charge, voltage, or resistance is then measured, digitized, and used to construct an image of the object, scene, or phenomenon 6 that emitted the photons. Applications for infrared FPAs include missile or related weapon guidance sensors, infrared astronomy, manufacturing inspection, thermal imaging, medical imaging, and infrared phenomenology (such as observing combustion, weapon impact, rocket motor ignition and other events that are interesting in the infrared spectrum), and the like.

Still referring to FIG. 1, the imager 2 and its FPA 4 receive and process incoming radiation from a scene 6. The incoming radiation 6 may be reflected off of a moving object and/or terrain and pass through one or more lenses 8, 12 before reaching the FPA 4. In one embodiment, a first lens 8 focusses the incoming radiation from the scene 6 onto a filter assembly 10. In some cases, the filter assembly comprises a plurality of filter sets 14 on a thin (e.g., 0.5 to 2.0 mm) substrate such as BK7, in the visible band, or Geranium, in the LWIR band. The substrate for the filter sets 14 can be any optically compatible material in the band of interest that is also compatible with the filters. In some cases, the filter assembly 10 is movable about the focal point 16 in the x direction (into the plane of the page) and the y direction 18 (within the pane of the page). In certain embodiments, each filter set 14 could be sized for a pixel set depending on the target of interest and objective optics in the system.

In one embodiment the system conveys a plurality of filters 14 onto an imager 2. In certain embodiments, the imager is a LWIR microbolometer. In some cases, the system utilizes micro-scanning with a 2 by 2 filter set where each quadrant in the filter set represents a different polarization state. In certain embodiments, each quadrant in the 2×2 filter set represents a different multispectral state.

In certain embodiments, as discussed in more detail in FIG. 2A and FIG. 2B, the filter assembly may be put into motion. In some cases, motion is timed to match the frame rate of a camera. In certain embodiments a step motor is used. In some cases a servomotor or other mechanism to move the filter is used. In one embodiment a piezoelectric actuator is sued as it has finer control steps. In another example a micro-scanning actuator is used where the micro-scanning actuator is a micro linear actuator or a micro piezoelectric actuator.

Referring to FIG. 2A, one embodiment of a micro level polarization and/or multispectral scanning system with circular oscillating motion within an optical objective according to the principles of the present disclosure is shown. More specifically, in this embodiment a 2 by 2 filter set 14' experiences circular motion 28 by moving in both x and y directions. The circular oscillating motion in x and y, out of phase, generates a circular scanning motion. Here, each filter 20, 22, 24, 26, represents a different polarization state, a different multispectral band, or the like. Using a relay filter approach as shown in FIG. 1, the filter is moved at about 2 to 5 Hz, 2 by 2 pixels (e.g., +/−.0.0005 inches in both dimensions) at a frequency synced to the imager frame rate allowing each filter to view the target of interest on a given pixel.

Referring to FIG. 2B, one embodiment of a micro level polarization and/or multispectral scanning system with linear oscillating motion within an optical objective according to the principles of the present disclosure is shown. More specifically, in another embodiment a 1 by 4 filter set (rows) 14" experiences linear oscillating motion 38 (e.g., moving +/−0.00 finches in a singular dimension) at a frequency synced to the imager frame rate to allow each filter to view the target on a given pixel. In one embodiment, linear motion for a 1 by 4 motion could be 0.000 by 0.002 inch motion.

In certain embodiments, the system uses the motion of the filter assembly to generate all the sample information across four frames (2 by 2 or 1 by 4). It is to be understood that the system of the present disclosure can support filter sets that are 2 by 2, 3 by 3, 4 by 4, 1 by 4, 1 by 3, 2 by 3, 3 by 4, and the like. It is a matter of determining how many multispectral bands or polarization states are necessary or beneficial for a particular mission and/or target declaration.

Figure 3:
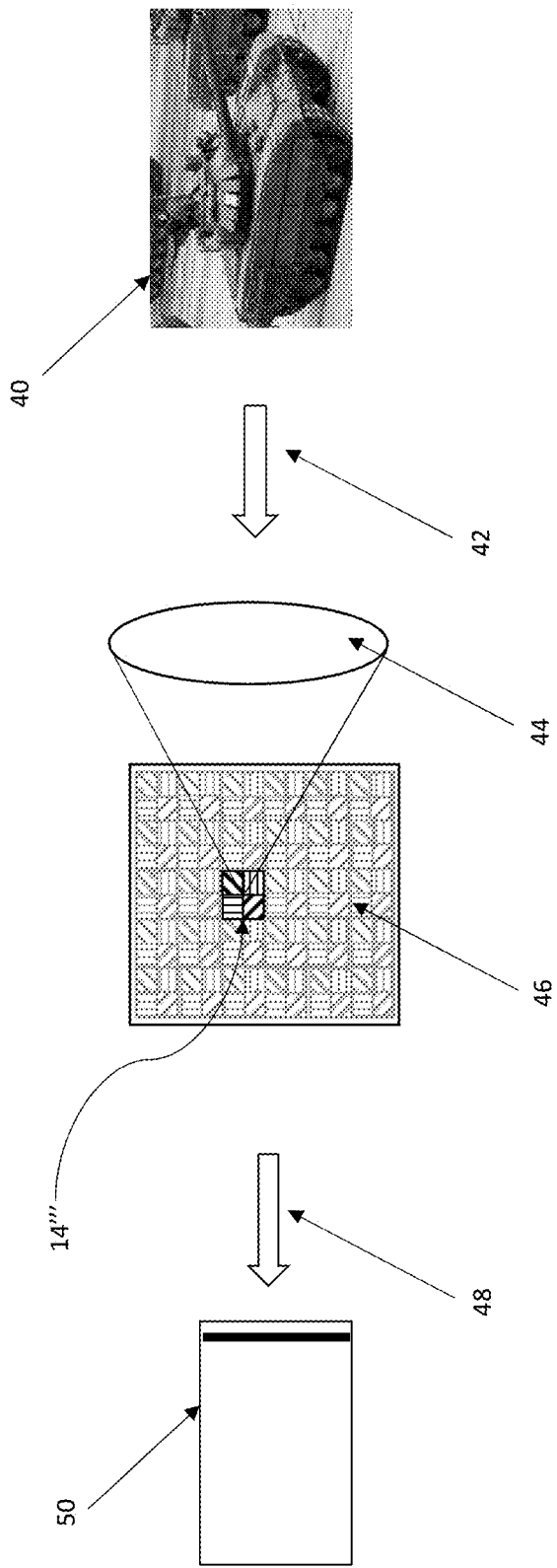
FIG. 3 is a diagrammatic view of one embodiment of a micro level polarization and/or multispectral system within an optical objective according to the principles of the present disclosure.

Referring to FIG. 3, a diagrammatic view of one embodiment of a micro level polarization and/or multispectral system within an optical objective according to the principles of the present disclosure is shown. More specifically, yet another embodiment of the system of the present disclosure is a static, non-moving filter approach. In one example, a 2 by 2 filter set 14''' covers a single target 40 (e.g., a tank). In this example, the tank 40 is imaged onto a 2 by 2 pixel set 14''' and provides a polarization difference and/or a multispectral difference depending on the filter assembly and filter set construction. In certain embodiments, each pixel provides a unique response and a FPGA 50 processes the ratios between each pixel in the 2 by 2 pixel set. The radiation 42 reflected off the target 40 is focused 44 onto the filter assembly 46. The radiation data received by the filter assembly is then received by 48 the FPGA and processed by the FPGA 50. This provides for real-time processing of a scene and is applicable to small form factors (e.g., 3-4 cm) with low SWaP and a greatly reduced cost compared to conventional systems.

One aspect of the present disclosure is a system comprising a filter having motion control via inertial measurement unit (IMU) inputs, positioned within the objective optics of an imager, the filter can perform complex scanning motions to collect polarization and/or multispectral data through the filter motion while nulling the spatial extent of the pixel motion relative to the ground. Nulling in this case means zeroing out the movement of the ground motion with equal and opposite motion of the micro scanner, to allow a fixed registration to the ground when the image is collected. As used herein, ground refers to a reference plane such as the ground or sea, earth, ground a stationary object being scanned by the weapon.

In a dynamic environment, over time each pixel will be receiving reflected light from a different place within the scene either due to vibration of the platform or due to a maneuver. By knowing the motion of the platform, e.g. using an IMU characterization, the placement of a specific filter pixel on a given detector pixel can be achieved, thus providing a full sampling of each pixel within the scene. A motion controller, aided by the IMU provides an image frame reference to map each pixel to the scene, frame by frame. The motion control via micro-scanning actuators positions the filter set to collect the contrast samples for each pixel location in the scene. A processing element of the system correlates the image frames using the IMU data to provide scene registration with all the filter samples properly aligned. This approach nulls both vertical and horizontal motion on a platform in a dynamic environment.

In one embodiment of the system the pixels are arranged in a 2 by 2 pixel cluster. In some cases, the micro-scanners would be in a circular motion in a static application, however applying vertical and horizontal offsets to allow for vibration in the environment as measured by the IMU or the like.

In one embodiment of the system the pixels could be arranged in a 1 by 4 array or rows. In some cases, the micro-scanners would be in a linear motion in a static application, however applying a transverse motion to offset vibration in the environment as measured by the IMU or the like.

In one embodiment of the system the pixels could be arranged in a 2 by 2 pixel cluster or a linear filter set (e.g., 1 by 4) and coupled with a Digital ROIC or DROIC. A DROIC has the inherent ability to take IMU angular rate data and shift the pixel integration from a pixel to an adjacent pixel mid integration to eliminate the need to remove vibration post processing. This results in a single pixel on the ground having a polarization and/or multispectral sample from each of the filters that can be compared and used for target identification.

Figure 4:
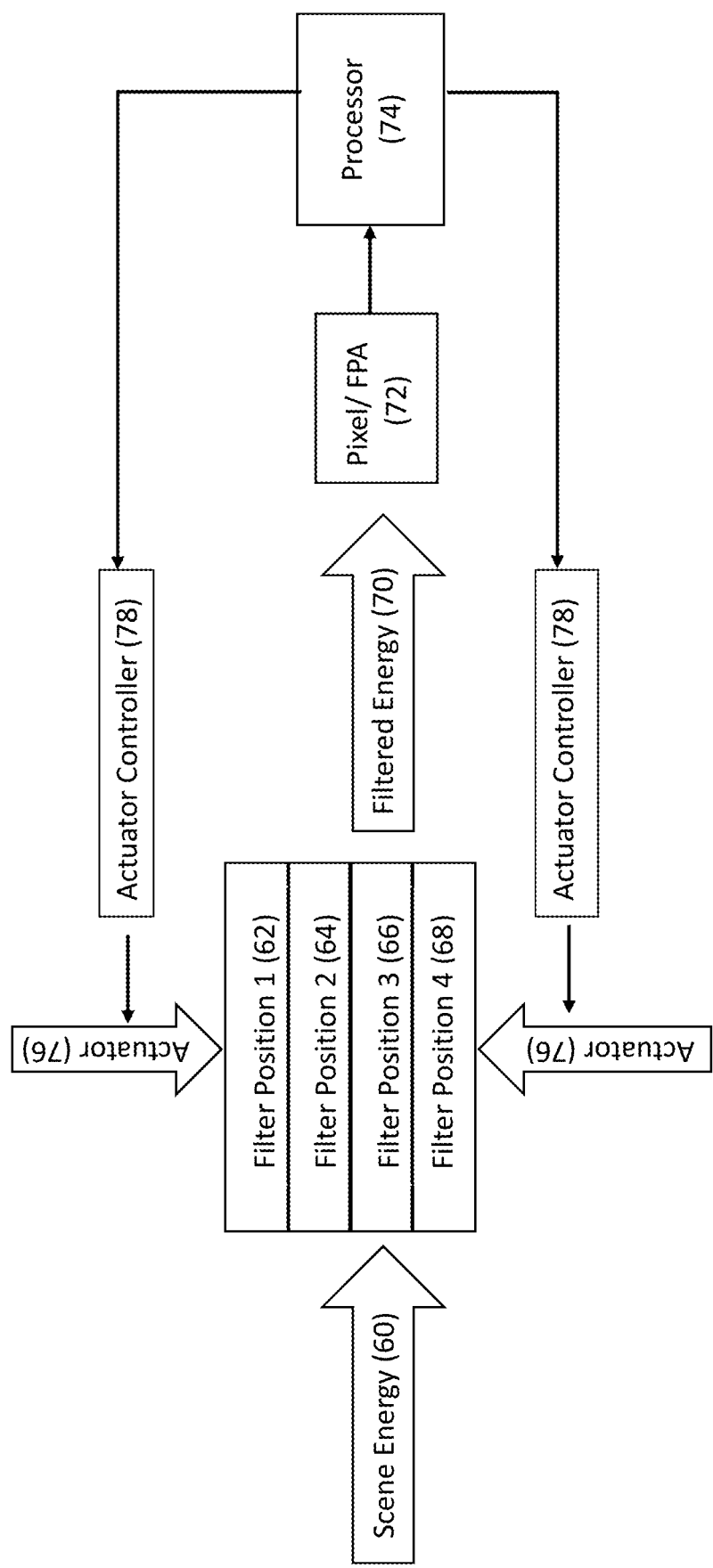
FIG. 4 is a diagram of one embodiment of a method of micro level polarization and/or multispectral scanning according to the principles of the present disclosure.

Referring to FIG. 4, a diagram of one embodiment of a method of micro level polarization and/or multispectral scanning according to the principles of the present disclosure. More specifically, scene energy 60 is passed through a filter assembly having filter portions (e.g., 1-4) 62, 64, 66, 68. The filtered energy 70 is scene energy passed through the filter and an amplitude reading is made by the FPA 72 and the image is ported to a processor 74. The processor 74 indexes the filter set and the steps are repeated. The processor correlates the sampled readings between frames and implements a detection algorithm. The cycle is repeated using actuators 76 controlled by actuator controllers 78 to move the filter assembly.

One aspect of the present disclosure is a system equipped with a filter containing polarized elements, multispectral elements or both is oscillated in circular or linear motion so each individual pixel will view the scene thru each of the individual filters. The motion of the filter is synchronized with a frame rate of an imager. This can be accomplished by micro actuators moving 2 by 2 pixels (+/−0.0005 inch for a 12 um pixel) or +/−0.001 inches for a 1 by 4 pixel. Each pixel sampling feeds a processor detection algorithm that determines if a multispectral/polarization signature is present in the scene.

Figure 5:
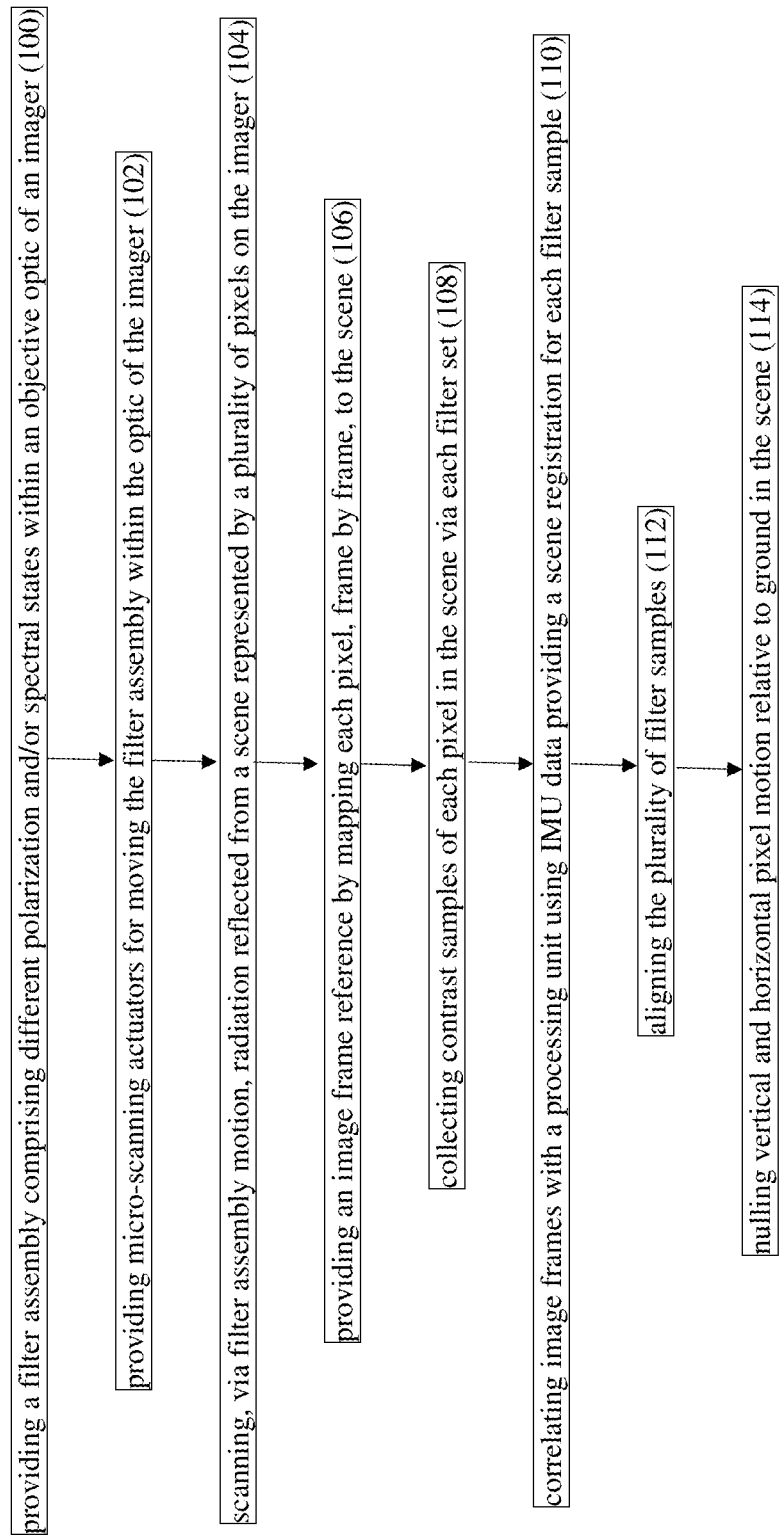
FIG. 5 is a flowchart of one embodiment of a method of micro level polarization and/or multispectral scanning according to the principles of the present disclosure.

Referring to FIG. 5, a flowchart of one embodiment of a method of micro level polarization and/or multispectral scanning according to the principles of the present disclosure. More specifically, one aspect of the present disclosure is a method for polarization and/or multi-spectral scanning within an optical objective comprising: providing a filter assembly positioned within an objective optic of an imager 100, wherein the filter assembly comprises a plurality of filter sets, each filter set comprising of a number of different polarization or spectral states. Micro-scanning actuators are used for moving the filter assembly within the objective optic of the imager 102; to scan, via the filter assembly motion, radiation reflected from a scene wherein the scene is represented by a plurality of pixels on the imager 104. The ground/scene is broken into smaller squares areas, each represented by a pixel and measures the reflected energy. The array of pixels, processed together forms the image. An image frame reference is provided by mapping each pixel, frame by frame, to the scene 106. Contrast samples of each pixel in the scene via each filter set are collected 108 and correlated as image frames with a processing unit and using IMU data thus providing a scene registration for each filter sample 110. The plurality of filter samples are aligned 112 and vertical and horizontal pixel motion is nulled relative to ground in the scene in a dynamic environment 114.

The computer readable medium as described herein can be a data storage device, or unit such as a magnetic disk, magneto-optical disk, an optical disk, or a flash drive. Further, it will be appreciated that the term "memory" herein is intended to include various types of suitable data storage media, whether permanent or temporary, such as transitory electronic memories, non-transitory computer-readable medium and/or computer-writable medium.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A method for polarization scanning within an optical objective comprising:
    providing a filter assembly positioned within an objective optic of an imager, wherein the filter assembly comprises a plurality of filter sets, each filter set comprising of a number of different polarization states;
    providing micro-scanning actuators for moving the filter assembly within the objective optic of the imager;
    scanning, via filter assembly motion, radiation reflected from a scene wherein the scene is represented by a plurality of pixels on the imager;
    providing an image frame reference by mapping the pixels, frame by frame, to the scene;
    collecting contrast samples of individual pixels in the scene via the filter set thereby providing a plurality of filter samples;
    correlating image frames with a processing unit and using inertial measurement unit (IMU) data thus providing a scene registration for the filter samples;
    aligning the plurality of filter samples; and
    nulling a vertical and a horizontal pixel motion relative to a ground in the scene.

2. The method for polarization scanning according to claim 1, wherein each filter set further comprises a number of different multispectral states.

3. The method for polarization scanning according to claim 1, wherein the imager is a LWIR microbolometer.

4. The method for polarization scanning according to claim 1, wherein the filter set is a 2×2 pixel filter set and the micro-scanning actuators move in a circular motion.

5. The method for polarization scanning according to claim 1, wherein the filter set is a 1×4 pixel filter set and the micro-scanning actuators move in a linear motion.

6. The method for polarization scanning according to claim 1, further comprising stabilizing a ground pointing with the micro-scanners via a digital readout integrated circuit (ROIC) having the ability to use IMU angular rate data and shift pixel integration from a first pixel to an adjacent pixel mid integration.

7. The method for polarization scanning according to claim 6, wherein a single pixel on the ground has polarization or multispectral samples from each of the filter sets that can be compared for use in target identification.

8. A method for multispectral scanning within an optical objective comprising:

providing a filter assembly positioned within an objective optic of an imager, wherein the filter assembly comprises a plurality of filter sets, at least one filter set comprising of a number of different multispectral states;

providing micro-scanning actuators for moving the filter assembly within the objective optic of the imager;

scanning, via filter assembly motion, radiation reflected from a scene wherein the scene is represented by a plurality of pixels on the imager;

providing an image frame reference by mapping each pixel, frame by frame, to the scene;

collecting contrast samples of each pixel in the scene via each filter set, resulting in a plurality of filter samples;

correlating image frames with a processing unit and using inertial measurement unit (IMU) data thus providing a scene registration for the filter samples;

aligning the plurality of filter samples; and nulling a vertical and a horizontal pixel motion relative to a ground in the scene in a dynamic environment.

9. The method for multispectral scanning according to claim 8, wherein each filter set further comprises a number of different polarization states.

10. The method for multispectral scanning according to claim 8, wherein the imager is a SWIR InGaAs array.

11. The method for multispectral scanning according to claim 8, wherein the filter set is a 2×2 pixel filter set and the micro-scanning actuators move in a circular motion.

12. The method for multispectral scanning according to claim 8, wherein the filter set is a 1×4 pixel filter set and the micro-scanning actuators move in a linear motion.

13. The method for multispectral scanning according to claim 8, further comprising stabilizing a ground pointing with the micro-scanners via a digital readout integrated circuit (ROIC) having the ability to use IMU angular rate data and shift pixel integration from a first pixel to an adjacent pixel mid integration.

14. The method for multispectral scanning according to claim 8, wherein a single pixel on the ground has polarization or multispectral samples from each of the filter sets that can be compared for use in target identification.

15. A system for multispectral or polarization scanning, within an optical objective comprising:

a filter assembly positioned within an objective optic of an imager, wherein the filter assembly comprises a plurality of filter sets, each filter set comprising of a number of different polarization states;

micro-scanning actuators for moving the filter assembly within the objective optic of the imager; and a processing unit configured to:
collect a plurality of filter samples from contrast samples of each pixel in the scene via each filter set;
correlate image frames using inertial measurement unit (IMU) data for providing a scene registration for each filter sample;
align the plurality of filter samples; and
null a vertical and a horizontal pixel motion relative to a ground in the scene in a dynamic environment.

16. The system according to claim 15, wherein each filter set further comprises a number of different multispectral states.

17. The system according to claim 15, wherein the filter set is a 2×2 pixel filter set and the micro-scanning actuators move in a circular motion.

18. The system according to claim 15, wherein the filter set is a 1×4 pixel filter set and the micro-scanning actuators move in a linear motion.

* * * * *